Nov. 7, 1950  F. Q. RAST  2,528,781
TENS-TRANSFER DEVICE

Original Filed April 15, 1944  7 Sheets-Sheet 1

FIG. 1.

INVENTOR.
Frederick Q. Rast
BY
Blair, Curtis + Hayward
ATTORNEYS

Nov. 7, 1950  F. Q. RAST  2,528,781
TENS-TRANSFER DEVICE
Original Filed April 15, 1944  7 Sheets-Sheet 3

FIG. 3.

INVENTOR
Frederick Q. Rast
BY
Blair, Curtis & Hayward
ATTORNEYS

Nov. 7, 1950        F. Q. RAST        2,528,781

TENS-TRANSFER DEVICE

Original Filed April 15, 1944        7 Sheets—Sheet 4

Nov. 7, 1950          F. Q. RAST          2,528,781
TENS-TRANSFER DEVICE Original Filed April 15, 1944          7 Sheets-Sheet 6

INVENTOR
Frederick Q. Rast
BY
Blair, Curtis + Hayward
ATTORNEYS

Nov. 7, 1950  F. Q. RAST  2,528,781
TENS-TRANSFER DEVICE
Original Filed April 15, 1944  7 Sheets-Sheet 7

INVENTOR
Frederick Q. Rast
BY
Blair, Curtis + Hayward
ATTORNEYS

Patented Nov. 7, 1950

2,528,781

UNITED STATES PATENT OFFICE 2,528,781

TENS-TRANSFER DEVICE

Frederick Q. Rast, Chicago, Ill., assignor to Commercial Controls Corporation, a corporation of Delaware Original application April 15, 1944, Serial No. 531,232. Divided and this application February 24, 1945, Serial No. 579,550

7 Claims. (Cl. 235—133)

This invention relates to registering mechanism and more particularly to a register for use in connection with the meter of a mail treating machine or the like.

One of the objects of this invention is to provide registering mechanism which is simple, thoroughly practical, and durable in use. Another object is to provide registering mechanism which is efficient and accurate in operation. Another object is to provide mechanism of the above character which may be manufactured from inexpensive materials without undue labor costs. Another object is to provide registering mechanism which will be strong and well able to withstand the strains of hard usage. Another object is to provide registering mechanism having a minimum of parts. Other objects will be in part obvious and in part pointed out hereinafter.

The invention accordingly consists in the features of construction, combinations of elements, and arrangements of parts, all as will be illustratively described herein, and the scope of the application which will be indicated in the following claims.

Referring now to the accompanying drawings in which is shown one of the various possible embodiments of this invention.

Similar reference characters refer to similar parts throughout the several views of the drawings.

This application is a division of the copending application of Frederick Q. Rast, which bears Serial No. 531,232, now Patent No. 2,482,935, and which was filed on April 15, 1944.

The registering mechanism described hereinafter is shown in use as a part of the meter of a metered mailing machine and in this use it keeps an accurate record of the sums printed by such a meter. The meter, generally indicated at 11 (Figure 1), has a series of setting knobs 7, 8, 9, and 10 by which each of the type wheels 212c, 212b, 212, and 212a (Figure 2) may be set at any digit between one and nine. The type wheels are mounted on a head shaft 109, which makes a complete revolution during each printing cycle, and coact with a platen (not shown) to print the sum at which they are set on an envelope or tape.

At the same time that the type wheels are set, other mechanism in the meter is conditioned so that during the cyclical operation of head shaft 109, the sum being printed by the type wheels is registered on ascending and descending registers 15 and 14. The housing of meter 11 (Figure 1) is provided with windows 295 and 32 through which the amount recorded on each register may be read. To set the type wheels and to register the sums being printed by them during a cyclical operation, there is a complete and separate train of mechanism (Figure 3) for each setting knob which leads from each setting knob to its type wheel and also to its indicator wheel. For example, the units setting knob 7 has a train of mechanism leading to the units indicator wheel 274 (Figure 5) and the tens setting knob 9 has a train of mechanism leading from it to the tens indicator wheel 271.

Each of these trains of mechanism includes a series of settable teeth mounted on and rotatable with head shaft 109. These teeth are moved into operative position at the same time that the type wheels are being set and correspond to the number set on a type wheel. Thus, for example, if the number 9 is set on a type wheel, nine teeth are moved into operative position or if the number 6 is set on a type wheel, then six teeth are moved into operative position. Then during the cyclical operation of the head shaft 109, the teeth in each train of mechanism which have been moved into operative position act upon the transfer pinion associated with it to turn the transfer pinion an amount corresponding to the sum set on the type wheel in the same train of mechanism.

Each of the transfer pinions 250, 251, 221, and 252 has a spur gear connected to its hub. All of these gears are similar to transfer pinion 221. Each transfer pinion has eight teeth and thus each Geneva tooth moves its transfer pinion a distance of two teeth or one-quarter of a revolution as it moves past its transfer pinion during a cyclical operation. Each unit of one in the number being printed by a type wheel in a train of mechanism is represented by one tooth, and thus during a cyclical operation the transfer pinions each make one-quarter of a revolution for each unit in the number set on their type wheel. As each of the transfer pinion spur gears has twenty teeth, each spur gear is moved a distance of five teeth for each unit in the number being printed.

Each of the spur gears 253, 254, 225, and 255 mesh with and drive idler gears 256, 257, 226, and 258 (Figures 2 and 3) respectively. Each of idler gears 256, 257, 226, and 258 feed into the indicator wheels associated with its train of mechanism. Thus, for example, if the number 5 is set on the dollars type wheel 212, then five teeth 153 are moved into operative position. Then when the head shaft makes its revolution to print the number set, the teeth 153 turn transfer pinion 221 one and one-quarter revolutions, and the transfer pinion acting through its spur gear 225 feeds twenty-five teeth into idler gear 226.

Referring now to the registers 14 and 15 which accurately and efficiently register the sum printed by the type wheels, details of construction will be limited to register 14 (Figures 3 and 4) as registers 14 and 15 are substantially similar in construction.

Figure 5:
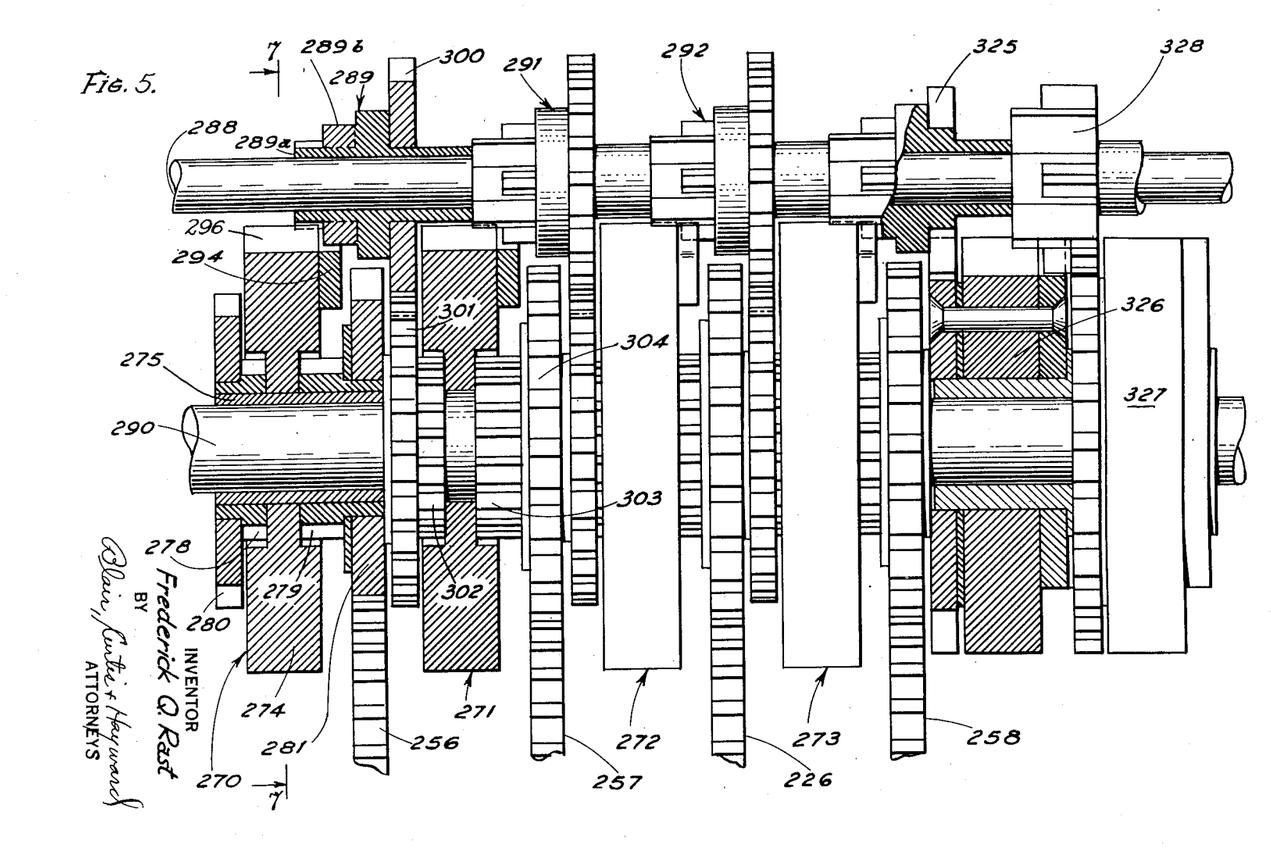
Figure 5 is a side view on an enlarged scale of one of the meter registers partly in section and partly in elevation for purposes of clarification.

As is best shown in Figure 5, each of idler gears 256, 257, 226, and 258 feeds into a register assembly including a pair of sun gears and an indicator wheel having two differential pinions mounted thereon. The units idler gear 256 feeds into the indicator wheel assembly, generally indicated at 270, the tens idler gear 257 feeds into the indicator wheel assembly, generally indicated at 271, the dollars idler gear 226 feeds into the indicator wheel assembly 272, and the tens of dollars idler gear 258 feeds into the indicator wheel assembly, generally indicated at 273.

Figure 6:
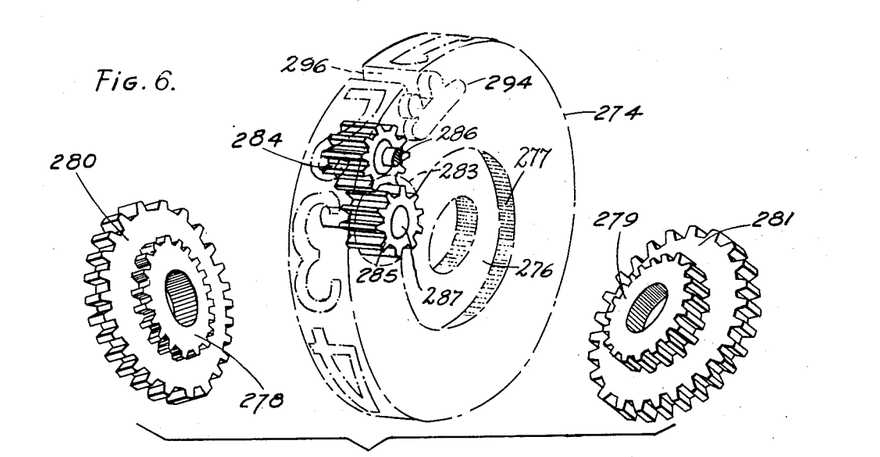
Figure 6 is an exploded perspective view of one of the register indicator wheels and parts associated therewith.
Figure 9:
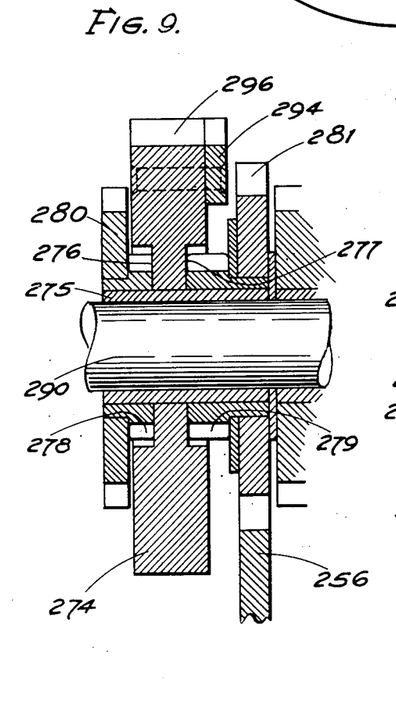
Figure 9 is a section taken on a line similar to line 9—9 of Figure 7 through one of the register indicator wheels and parts associated therewith; and, Figure 10 is a side elevation of one of the register indicator wheels partly in section to show the mounting of the differential pinions thereon.

Referring first to indicator wheel assembly 270, the indicator wheel 274 (Figure 9) is rotatably mounted on a bushing 275 mounted on the register shaft 290. Indicator wheel 274 has two sun gear bores 276 and 277 cut into the opposite sides thereof concentric to the axis of rotation of the indicator wheel. These bores are made to receive two sun gears 278 and 279 (Figures 6 and 9) which are rotatably mounted on bushing 275 on opposite sides of indicator wheel 274. Sun gear 278, which has twenty teeth, has a gear 280 mounted on and connected to its hub and this gear is connected to the framework of the meter so that both gears are held stationary at all times. The sun gear 279, which has twenty teeth, has a spur gear 281 mounted on and connected to its hub. This gear has twenty-five teeth.

Figure 8:
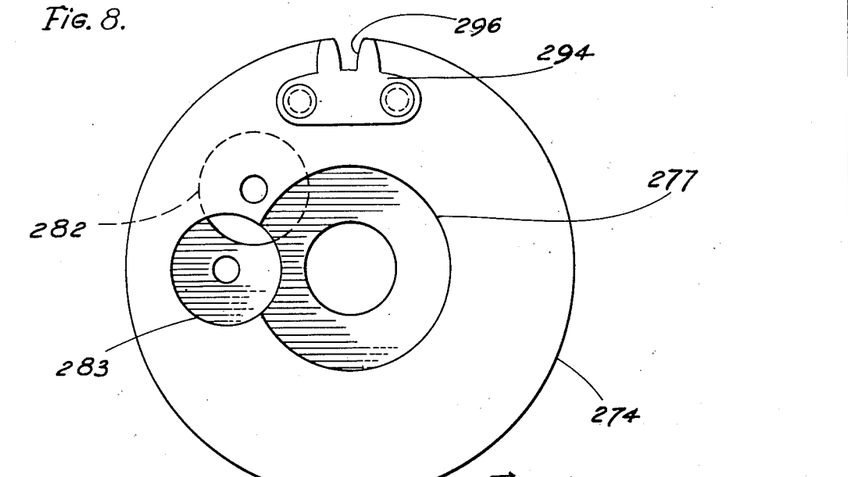
Figure 8 is a side elevation of one of the register indicator wheels.
Figure 10:
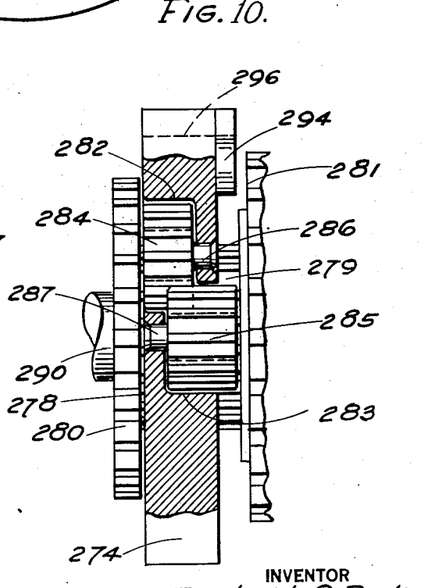

Indicator wheel 274 has two other bores 282 and 283 (Figure 8) extending into the body of the indicator wheel from opposite sides thereof. These bores 282 and 283 are in overlapping relationship with respect to each other and bore 282 overlaps sun gear bore 277 and bore 283 overlaps sun gear bore 276. Differential pinions 284 and 285 are rotatably mounted on pins 286 and 287 (Figure 10) mounted on the indicator wheel 274. When sun gears 278 and 279 and the indicator wheel 274 are in assembled relationship, the differential pinions 284 and 285, which mesh at the point bores 282 and 283 (Figure 8) overlap, mesh with sun gears 278 and 279 (Figures 6 and 10), respectively. Thus, when sun gear 279 is turned by idler gear 256 acting through gear 281, indicator wheel 274, which in fact is a planetary support for the differential pinions, is rotated as pinion 284 runs on stationary sun gear 278.

As described hereinabove, idler gear 256 (Figure 5) is turned a distance of five teeth for each unit of one in the number being printed. As gear 256 meshes with gear 281 which has twenty-five teeth and the sun gear 279 connected to gear 281 has twenty teeth, the sun gear moves four teeth each time a unit is fed into indicator wheel assembly 270. There are ten digits on indicator wheel 274 and thus as sun gear 278 is stationary when sun gear 279 moves a distance of four teeth then the indicator wheel 274 moves a distance of two teeth or one unit.

Referring to Figure 5, a transfer pinion shaft 288 has a series of standard Geneva transfer pinions, generally indicated at 289, 291, and 292 rotatably mounted thereon which carry over tens from each indicator wheel to the next higher one. The long or sliding teeth 289a (Figures 5 and 7) of transfer pinion 289 slide on the periphery of indicator wheel 274. A pair of Geneva carry-over teeth are mounted on the right-hand side of indicator wheel 274 as viewed in Figures 5 and 9 and these teeth are in radial alignment (Figure 5) with the short teeth 289b of the Geneva transfer pinion.

Figure 3:
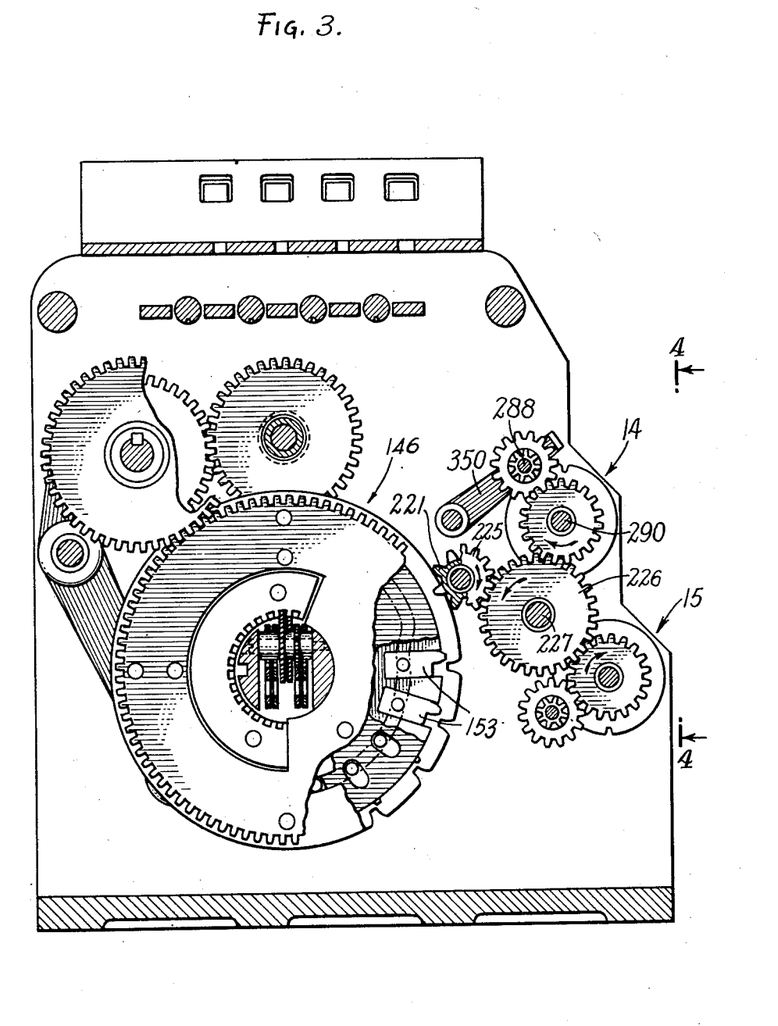
Figure 3 is a vertical section taken on the line 3—3 of Figure 2.
Figure 4:
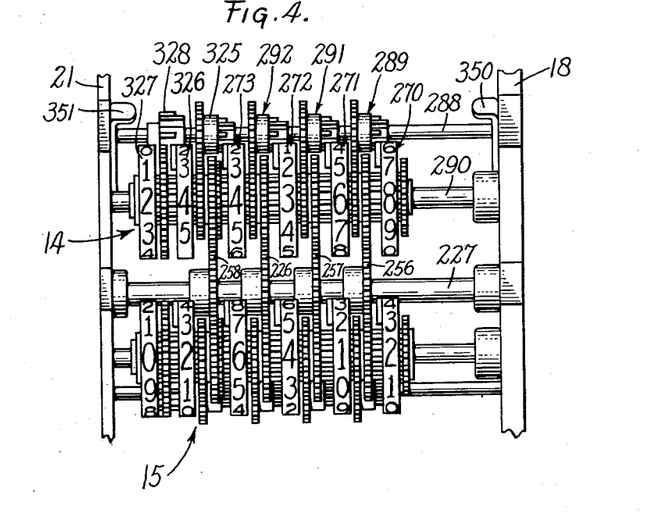
Figure 4 is a side elevation taken on the line 4—4 of Figure 3 showing the ascending and descending registers.

Referring to Figure 3, Geneva transfer pinion 221 is driven in a clockwise direction by assembly 146. This drives idler gear 226 in a counterclockwise direction. Idler gear 256 is driven in the same direction as gear 226 and in turn drives indicator wheel 274 in a counterclockwise direction, as viewed in Figure 9, acting through gears 281, 271, and pinions 285 and 284.

As the indicated figure in the window 295 in housing 11 (Figures 1 and 7) passes from zero to nine, the leading tooth 294a of Geneva teeth 294 strikes a short tooth of transfer pinion 289. This turns the transfer pinion a distance of two teeth, the long tooth on the transfer pinion entering a notch 296 (Figures 8 and 9) in the periphery of indicator wheel 274 and entering the space between Geneva teeth 294.

Figures 7, 7A:
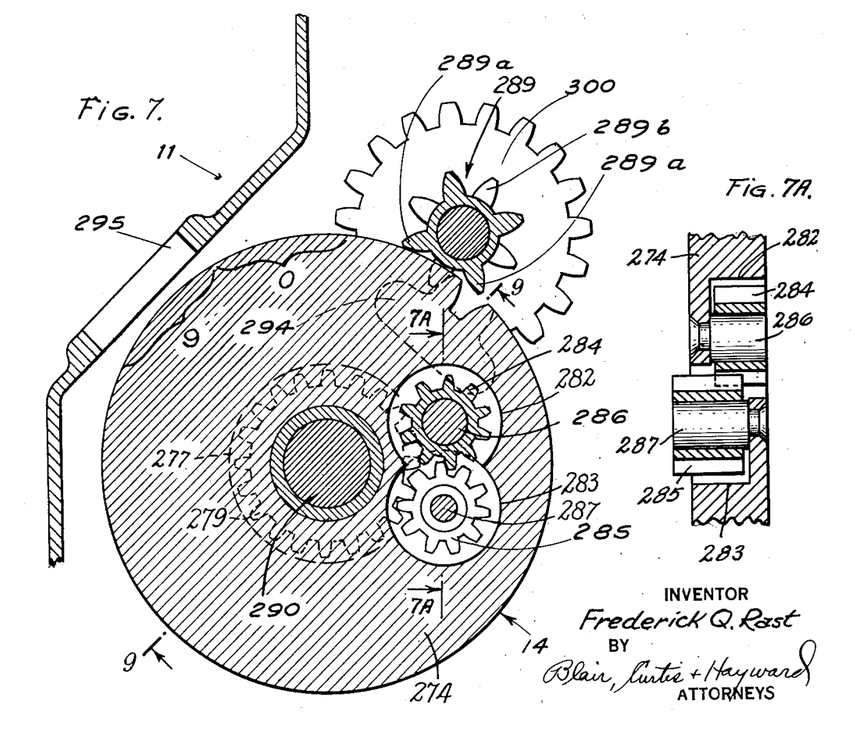
Figure 7 is a vertical section taken on the line 7—7 of Figure 5.
Figure 7a is a vertical section taken along the line 7a—7a of Figure 7.

Geneva pinion 289 is turned in a clockwise direction, as viewed in Figure 7, when a carry-over is effected by Geneva teeth 294, and a spur gear 300 (Figures 5 and 7) mounted on and connected to the hub of transfer pinion 289 turns with it. Spur gear 300 has twenty teeth and thus is moved a distance of five teeth each time a carry-over is effected because the Geneva pinion which has eight teeth is turned two teeth or one-quarter of a revolution by a carry-over.

Spur gear 300 meshes with and drives a gear 301 mounted on and connected to the hub of a sun gear 302 of indicator wheel assembly 271. Sun gear 302 and spur gear 300 are rotatably mounted on a bushing similar to bushing 275 (Figure 9) on shaft 290 and the remainder of assembly 271 is similar in construction to assembly 270.

In operation, units may be fed into both spur gears 281 and 304 at the same time through idler gears 256 and 257. This drives the sun gears 279 and 303 and if a carry-over is not taking place, both sun gears 278 and 302 are held stationary, sun gear 278 being held by mechanical means on the meter and sun gear 302 is held stationary by its association with transfer pinion 289 through spur gears 301 and 300. When a carry-over takes place, then spur gear 300 drives spur gear 301 a total of five teeth. As sun gear 302 has twenty teeth, it is moved a distance of four teeth. If at this time units are being fed into this indicator wheel assembly by idler gear 257 then sun gear 303 is also turned a distance of four teeth in the same direction. At this time because both sun gears are turned together the indicator wheel 271 is moved a distance of four teeth thus registering the carry-over from the units wheel at the same time it is registering the unit being fed into it by idler gear 257.

If idler gear 257 is not feeding units into the indicator wheel assembly 271, then sun gear 303 is held stationary by idler gear 257. Accordingly, when there is a carry-over from the units indicator wheel then spur gear 301 is moved a distance of five teeth, sun gear 302 having twenty teeth moves a distance of four teeth and the differential then coacts with the stationary sun gear 303 to move the indicator wheel two teeth or one digit. Thus a carry-over may be readily made at any time during the operation of the register.

The operation of indicator wheel assemblies 272 and 273 is the same as the operation of indicator wheel assemblies 270 and 271. Tens are carried over from assembly 271 to assembly 272 by Geneva transfer pinion 291 and tens are carried from assembly 272 to assembly 273 by Geneva transfer pinion 292. In this register units may be fed into all four assemblies at the same time and carry-overs are made from one assembly to another whenever they occur.

The transfer pinion 325 actuated by assembly 273 feeds into a standard indicator wheel 326. This wheel carries over tens accumulated by it to another standard indicator wheel 327 through a transfer pinion 328. Any number of wheels may be added to the register, the total depending on the largest accumulated total that is desired. Furthermore, the indicator wheel assemblies may consist of any number above a pair, the limit being determined only by the number of banks feeding into the register.

The descending and ascending registers 14 and 15 (Figure 3) are of similar construction, the indicator wheel idler gears 256, 257, 226, and 258 (Figure 4) driving spur gears in aligned indicator wheel assemblies in both registers at the same time and in the same direction. The only difference between the ascending and descending registers 15 and 14 is that the digits on their indicator wheels run in opposite directions.

Figure 1:
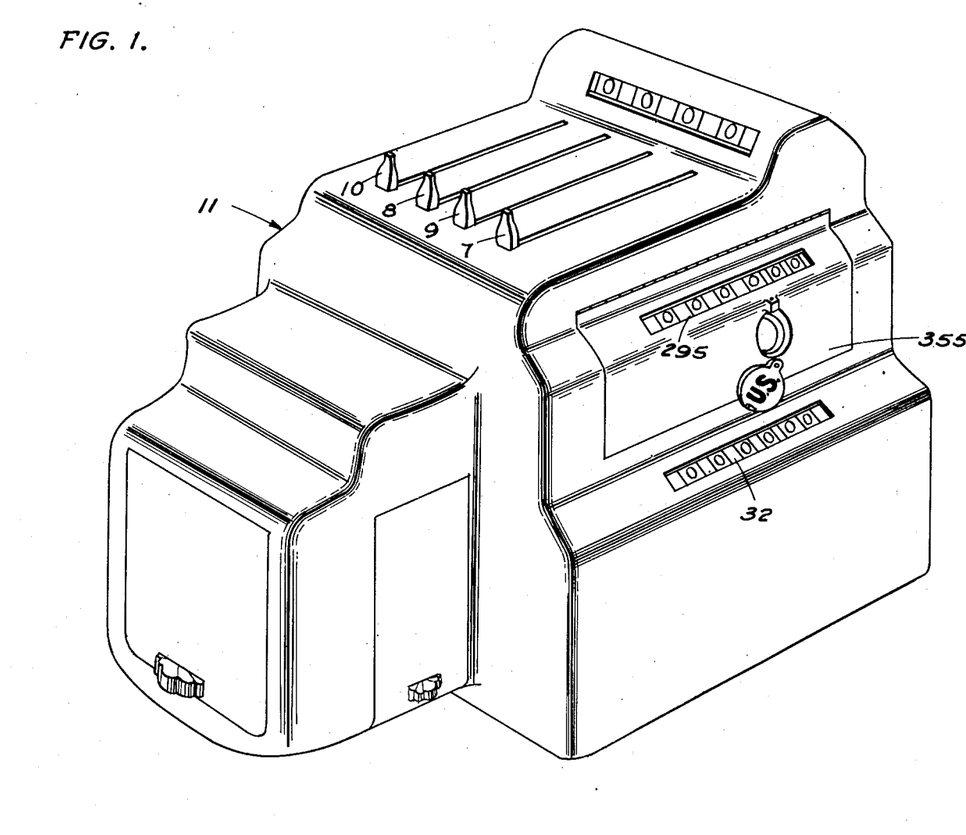
Figure 1 is a perspective view of a meter having my registering mechanism included therein as a part of its mechanism.
Figure 2:
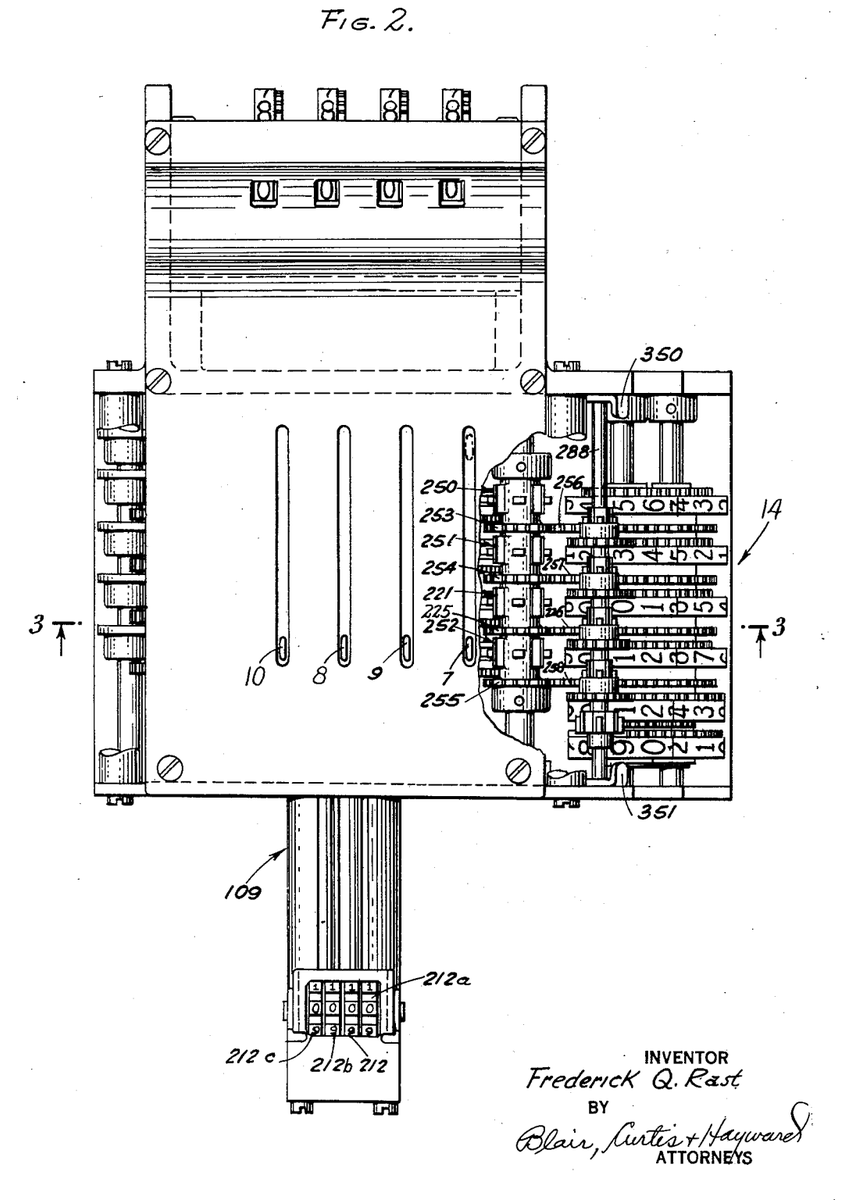
Figure 2 is a top plan view of the meter with the housing removed, certain portions of the meter being broken away for purposes of clarification.

A zero lock (not shown) of any well known type may be used in conjunction with register 14 to lock the meter when this register reaches zero setting. Thus the register may be loaded with a certain sum by a post office clerk and when this sum is exhausted the zero lock is actuated to prevent further use of the meter. To set register 14, the transfer pinion shaft 288 which is mounted on a pair of arms 350 and 351 (Figures 3 and 4) is raised. Arms 350 and 351 are pivotally mounted at their inner ends to the front and rear walls 21 and 18 of the framework thus permitting shaft 288 to be raised. Raising shaft 288 moves the transfer pinions and their associated spur gears thereon out of meshing engagement with the indicator wheel assembly spur gears. At this time the indicator wheels may be set at any desired sum. Thus it is very easy for a post office clerk to reset the meter through door 355 (Figure 1).

The register described hereinabove is so constructed that it may be used in a variety of different types of mechanism to accurately and efficiently register sums and thus its use is not limited to a metered mailing machine. From the above description, it will become clear that an efficient and practical register is disclosed. Furthermore, carry-overs may be made in this register while units are being fed into the indicator wheel assembly to which the carry-over is being made. Thus a register is disclosed which both registers any sum and carries over the tens accumulated as the sum is being registered.

As many possible embodiments may be made of the above invention all without departing from the scope of the invention it is to be understood that all matter hereinbefore set forth, or shown in the accompanying drawings, is to be interpreted as illustrative and not in a limiting sense.

I claim:

1. An indicator register comprising, in combination, a shaft, an assembly on said shaft comprising an indicator wheel, a pair of planetary gears and a pair of sun gears, said indicator wheel being rotatably mounted on said shaft, said planetary gears being in mesh and rotatably mounted on said wheel and said sun gears meshing respectively with said planetary gears, a second assembly similar to the first mounted on said shaft, each of said indicator wheels having digits from 0 to 9 thereon, means for driving one sun gear of each assembly, a transfer gear for driving the second sun gear of the second assembly, and Geneva drive means between the indicator wheel of said first assembly and said transfer gear for imparting partial rotation to said transfer gear and accordingly to the second sun gear of the second assembly upon completion of one rotation of the indicator wheel of said first assembly, whereby the indicator wheel of the second assembly rotates at a higher rate of speed when both sun gears of the second assembly are driven simultaneously than when only one of the sun gears of the second assembly is driven.

2. An indicating register comprising, in combination, a shaft, a units wheel and a tens wheel rotatably mounted on said shaft, gear means for feeding units into said units wheel, transfer gear means between said wheels for carrying over a ten unit to said tens wheel when said unit wheel completes one revolution, said tens wheel having associated therewith a pair of gears rotatably mounted on said shaft, one of said gears meshing with said transfer gear means, input gear means for driving the other of said gears, and meshing planetary gears rotatably mounted on said tens wheel and meshing with said first mentioned gears whereby said tens wheel may be driven by the carry-over drive of the transfer gear means, by said last-mentioned input gear means, or by both carry-over drive of the transfer gear means and said last-mentioned input gear means.

3. An indicating register comprising, in combination, a shaft, a units wheel and a tens wheel rotatably mounted on said shaft, a pair of differential gears rotatably mounted on said tens wheel in meshing engagement with respect to each other, transfer gear means for carrying over a tens unit to said tens wheel from said units wheel for each revolution of said units wheel, gear means mounted on said shaft meshing with said transfer gear means and one of said differential gears, and gear means mounted on said shaft and meshing with the other of said differential gears, said last-mentioned gear means being the input gear means for said tens wheel, whereby said tens wheel may be driven independently of or simultaneously with the carry-over drive of the transfer gear means.

4. An indicating register comprising, in combination, a shaft, a units wheel and a tens wheel rotatably mounted on said shaft, a pair of meshing differential gears mounted on said tens wheel, a pair of sun gears mounted on said shaft, input gear means operatively connected to one of said sun gears, said last-mentioned sun gear meshing with one of said differential pinions, transfer gear means actuated by said units wheel, a gear mounted on said shaft meshing with said transfer gear means, said last-mentioned gear being connected to the other of said sun gears, said last-mentioned sun gear meshing with the other of said differential pinions, and means for feeding units into said units wheel.

5. An indicating register comprising, in combination, a shaft, a units indicator wheel and a tens indicator wheel rotatably mounted on said shaft, a pair of meshing differential pinions rotatably mounted on said tens wheel, said differential pinions being offset axially with respect to each other, a pair of sun gears mounted on said shaft on opposite sides of said tens wheel, said sun gears each meshing with the offset portion of one of said pinions, gear means for feeding units into said units wheel, transfer gear means actuated by said units wheel, said last-mentioned gear means actuating one of said sun gears, and tens input gear means actuating the other of said sun gears whereby said tens wheel may be driven by said transfer gear means, said tens wheel input gear means, or by both said transfer gear means and said tens wheel input gear means simultaneously.

6. An indicating register comprising, in combination, a shaft, a units indicator wheel and a tens indicator wheel rotatably mounted on said shaft, a pair of meshing differential pinions rotatably mounted on said units wheel, a pair of sun gears each engaging one of said differential pinions, means preventing one of said sun gears from rotating with respect to said shaft, input gear means for driving the other of said sun gears and thus said units wheel through said differential pinions, transfer gear means actuated each time said units wheel makes a revolution, a pair of meshing differential pinions rotatably mounted on said tens wheel, a pair of sun gears rotatably mounted on said shaft on opposite sides of said tens wheel, each of said sun gears meshing with one of said tens wheel differential pinions, gear means operatively connecting said transfer gear means to one of said tens wheel sun gears, and input gear means actuating the other of said tens wheel sun gears whereby said tens wheel may be actuated by said transfer gear means, by said tens wheel input gear means, or by both said transfer gear means and input gear means acting simultaneously.

7. An indicator register comprising, in combination, a shaft, a units indicator wheel and a tens indicator wheel rotatably mounted on said shaft, gear means for feeding units into said units wheel, a pair of meshing differential pinions rotatably mounted on said tens wheel, a pair of sun gears each having the same number of teeth rotatably mounted on said shaft, each of said sun gears meshing with one of said differential pinions, a pair of spur gears each connected to one of said sun gears, said spur gears each having the same number of teeth, tens wheel input gear means for driving one of said spur gears, and transfer gear means actuated by said units wheel for carrying over accumulated tens from said units wheel to said tens wheel, said transfer gear means meshing with and driving the other of said spur gears and thus the sun gear connected thereto, the degree of rotation imparted to said last-mentioned spur gear for each tens unit carried over by said transfer gear means being equal to the amount of drive imparted to the other spur gear by said tens wheel input gear means each time a tens unit is fed into said tens wheel, whereby said tens wheel may be actuated by said transfer gear means, by said tens wheel input gear means, or by both said transfer gear means and input gear means acting simultaneously.

FREDERICK Q. RAST.

REFERENCES CITED

The following references are of record in the file of this patent:

UNITED STATES PATENTS

| Number | Name | Date |
|---|---|---|
| 484,814 | Osborn | Oct. 25, 1892 |
| 503,946 | Cook | Aug. 29, 1893 |
| 1,469,932 | Adams | Oct. 9, 1923 |
| 1,693,279 | Kreider | Nov. 27, 1928 |

FOREIGN PATENTS

| Number | Country | Date |
|---|---|---|
| 102,105 | Austria | Dec. 28, 1925 |